US007392195B2

(12) United States Patent
Fejzo

(10) Patent No.: US 7,392,195 B2
(45) Date of Patent: Jun. 24, 2008

(54) LOSSLESS MULTI-CHANNEL AUDIO CODEC

(75) Inventor: Zoran Fejzo, Los Angeles, CA (US)

(73) Assignee: DTS, Inc.

( * ) Notice: Subject to any disclaimer, the term of this patent is extended or adjusted under 35 U.S.C. 154(b) by 394 days.

(21) Appl. No.: 10/911,067

(22) Filed: Aug. 4, 2004

(65) Prior Publication Data

US 2005/0216262 A1 Sep. 29, 2005

Related U.S. Application Data

(60) Provisional application No. 60/556,183, filed on Mar. 25, 2004.

(51) Int. Cl.
*H04R 5/02* (2006.01)
*H04B 1/66* (2006.01)

(52) U.S. Cl. ............................... 704/500; 381/2; 381/20

(58) Field of Classification Search ................. 704/219, 704/221, 222, 230, 500, 501; 341/51, 65, 341/67; 381/2, 20, 22

See application file for complete search history.

(56) References Cited

U.S. PATENT DOCUMENTS

| | | | | |
|---|---|---|---|---|
| 4,833,718 | A * | 5/1989 | Sprague | 704/229 |
| 6,023,233 | A | 2/2000 | Craven | |
| 6,226,608 | B1 * | 5/2001 | Fielder et al. | 704/229 |
| 6,226,616 | B1 | 5/2001 | You | |
| 6,385,571 | B1 * | 5/2002 | Heo | 704/200.1 |
| 6,446,037 | B1 * | 9/2002 | Fielder et al. | 704/229 |
| 6,487,535 | B1 * | 11/2002 | Smyth et al. | 704/500 |
| 6,675,148 | B2 * | 1/2004 | Hardwick | 704/500 |
| 6,784,812 | B2 | 8/2004 | Craven | |
| 7,272,567 | B2 * | 9/2007 | Fejzo | 704/500 |

OTHER PUBLICATIONS

T. Robinson. "SHORTEN: Simple Lossless and Near Lossless Waveform Compression," Tech. Report 156, Cambridege Univ, Dec. 1994.

"Surcode MLP- Owner's Manual" -Minnetonka Audio, pp. 1 to 43.

Hans Mat and Schafer, Ronald, "Lossless Compression of Digital Audio" Hewlett Packard, Paolo Alto, Nov. 1999 (HPL-1999-144).

* cited by examiner

*Primary Examiner*—Martin Lerner
(74) *Attorney, Agent, or Firm*—Blake Welcher; William Johnson; Eric Gifford

(57) ABSTRACT

A lossless audio codec segments audio data within each frame to improve compression performance subject to a constraint that each segment must be fully decodable and less than a maximum size. For each frame, the codec selects the segment duration and coding parameters, e.g., a particular entropy coder and its parameters for each segment, that minimizes the encoded payload for the entire frame subject to the constraints. Distinct sets of coding parameters may be selected for each channel or a global set of coding parameters may be selected for all channels. Compression performance may be further enhanced by forming M/2 decorrelation channels for M-channel audio. The triplet of channels (basis, correlated, decorrelated) provides two possible pair combinations (basis, correlated) and (basis, decorrelated) that can be considered during the segmentation and entropy coding optimization to further improve compression performance.

17 Claims, 12 Drawing Sheets

LOSSLESS MULTI-CHANNEL AUDIO CODEC

CROSS-REFERENCE TO RELATED APPLICATIONS

This application claims benefit of priority under 35 U.S.C. 119(e) to U.S. Provisional Application No. 60/556,183 entitled "Backward Compatible Lossless Audio Codec" filed on Mar. 25, 2004, the entire contents of which are incorporated by reference.

BACKGROUND OF THE INVENTION

1. Field of the Invention

This invention relates to lossless audio codecs and more specifically to a lossless multi-channel audio codec with improved compression performance.

2. Description of the Related Art

Numbers of low bit-rate lossy audio coding systems are currently in use in a wide range of consumer and professional audio playback products and services. For example, Dolby AC3 (Dolby digital) audio coding system is a world-wide standard for encoding stereo and 5.1 channel audio sound tracks for Laser Disc, NTSC coded DVD video, and ATV, using bit rates up to 640 kbit/s. MPEG I and MPEG II audio coding standards are widely used for stereo and multi-channel sound track encoding for PAL encoded DVD video, terrestrial digital radio broadcasting in Europe and Satellite broadcasting in the US, at bit rates up to 768 kbit/s. DTS (Digital Theater Systems) Coherent Acoustics audio coding system is frequently used for studio quality 5.1 channel audio sound tracks for Compact Disc, DVD video, Satellite Broadcast in Europe and Laser Disc and bit rates up to 1536 kbit/s.

Recently, many consumers have shown interest in these so-called "lossless" codecs. "Lossless" codecs rely on algorithms which compress data without discarding any information and produce a decoded signal which is identical to the (digitized) source signal. This performance comes at a cost: such codecs typically require more bandwidth than lossy codecs, and compress the data to a lesser degree.

FIG. 1 is a block diagram representation of the operations involved in losslessly compressing a single audio channel. Although the channels in multi-channel audio are generally not independent, the dependence is often weak and difficult to take into account. Therefore, the channels are typically compressed separately. However, some coders will attempt to remove correlation by forming a simple residual signal and coding (Ch1, Ch1-CH2). More sophisticated approaches take, for example, several successive orthogonal projection steps over the channel dimension. All techniques are based on the principle of first removing redundancy from the signal and then coding the resulting signal with an efficient digital coding scheme. Lossless codecs include MPL (DVD Audio), Monkey's audio (computer applications), Apple lossless, Windows Media Pro lossless, AudioPak, DVD, LTAC, MUSICcompress, OggSquish, Philips, Shorten, Sonarc and WA. A review of many of these codecs is provided by Mat Hans, Ronald Schafer "Lossless Compression of Digital Audio" Hewlett Packard, 1999.

Framing 10 is introduced to provide for editability, the sheer volume of data prohibits repetitive decompression of the entire signal preceding the region to be edited. The audio signal is divided into independent frames of equal time duration. This duration should not be too short, since significant overhead may result from the header that is prefixed to each frame. Conversely, the frame duration should not be too long, since this would limit the temporal adaptivity and would make editing more difficult. In many applications, the frame size is constrained by the peak bit rate of the media on which the audio is transferred, the buffering capacity of the decoder and desirability to have each frame be independently decodable.

Intra-channel decorrelation 12 removes redundancy by decorrelating the audio samples in each channel within a frame. Most algorithms remove redundancy by some type of linear predictive modeling of the signal. In this approach, a linear predictor is applied to the audio samples in each frame resulting in a sequence of prediction error samples. A second, less common, approach is to obtain a low bit-rate quantized or lossy representation of the signal, and then losslessly compress the difference between the lossy version and the original version. Entropy coding 14 removes redundancy from the error from the residual signal without losing any information. Typical methods include Huffman coding, run length coding and Rice coding. The output is a compressed signal that can be losslessly reconstructed.

The existing DVD specification and the preliminary HD DVD specification set a hard limit on the size of one data access unit, which represents a part of the audio stream that once extracted can be fully decoded and the reconstructed audio samples sent to the output buffers. What this means for a lossless stream is that the amount of time that each access unit can represent has to be small enough that the worst case of peak bit rate, the encoded payload does not exceed the hard limit. The time duration must be also be reduced for increased sampling rates and increased number of channels, which increase the peak bit rate.

To ensure compatibility, these existing coders will have to set the duration of an entire frame to be short enough to not exceed the hard limit in a worst case channel/sampling frequency/bit width configuration. In most configurations, this will be overkill and may seriously degrade compression performance. Furthermore, this worst case approach does not scale well with additional channels.

SUMMARY OF THE INVENTION

The present invention provides a lossless audio codec in which compression performance is optimized subject to a maximum size constraint on each independently decodable unit of data.

The lossless audio codec segments audio data within each frame to improve compression performance subject to a constraint that each segment must be fully decodable and less than a maximum size. For each frame, the codec selects the segment duration and coding parameters, e.g., a particular entropy coder and its parameters for each segment, that minimizes the encoded payload for the entire frame subject to the constraints. Distinct sets of coding parameters may be selected for each channel or a global set of coding parameters may be selected for all channels. Compression performance may be further enhanced by forming M/2 decorrelation channels for M-channel audio. The triplet of channels (basis, correlated, decorrelated) provides two possible pair combinations (basis, correlated) and (basis, decorrelated) that can be considered during the segmentation and entropy coding optimization to further improve compression performance. The channel pairs may be specified per segment or per frame.

In an exemplary embodiment, the encoder frames the audio data and then extracts ordered channel pairs including a basis channel and a correlated channel and generates a decorrelated channel to form at least one triplet (basis, correlated, decorrelated). If the number of channels is odd, an extra basis channel is processed. Adaptive or fixed polynomial prediction is applied to each channel to form residual signals.

The encoder determines the segment duration, channel pairs ((basis, correlated) or (basis, decorrelated)) for the frame and sets of coding parameters (entropy code selection and parameters) for each segment by first partitioning the frame into a maximum number of segments of minimum duration. The optimal coding parameters for the current partition are determined by calculating the parameters for one or more entropy coders (Binary, Rice, Huffman, etc.) and selecting the coder and parameters with the smallest encoded payload for each channel (basis, correlated, decorrelated) for each segment. For each triplet, the channel pair (basis, correlated) or (basis, decorrelated) with the smallest encoded payload is selected. Using the selected channel pair, a global set of coding parameters can be determined for each segment over all channels. The encoder selects the global set or distinct sets of coding parameters based on which has the smallest total encoded payload (header and audio data).

Once the optimal set of coding parameters and channel pairs for the current partition have been determined, the encoder calculates the encoded payload in each segment across all channels. Assuming the constraint on maximum segment size is satisfied, the encoder determines whether the total encoded payload for the entire frame for the current partition is less than the current optimum for an earlier partition. If true, the current set of coding parameters and encoded payload is stored and the segment duration is increased. This process repeats until either the segment size violates the maximum size constraint or the segment duration grows to the frame duration. The encoder entropy codes (using the selected entropy coder and parameters) the residual signals in each audio channel of the selected channel pairs and all unpaired channels.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a lossless audio codec in which compression performance is optimized subject to a maximum size constraint on each independently decodable unit of data. The audio coder scales as the number of channels in multi-channel audio continues to grow.

Lossless Audio Codec

Figure 1:
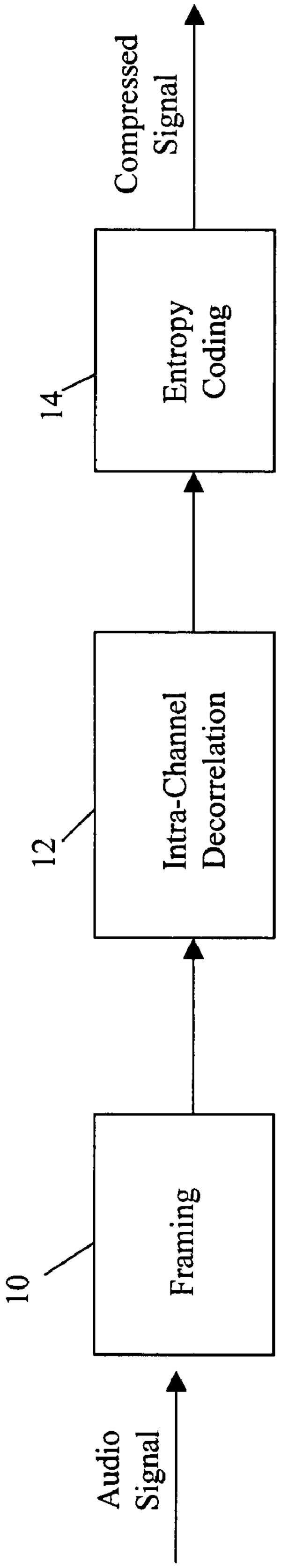
Fig. 1 (Prior Art)
FIG. 1, as described above, is a block diagram for a standard lossless audio encoder.
Figure 2A:
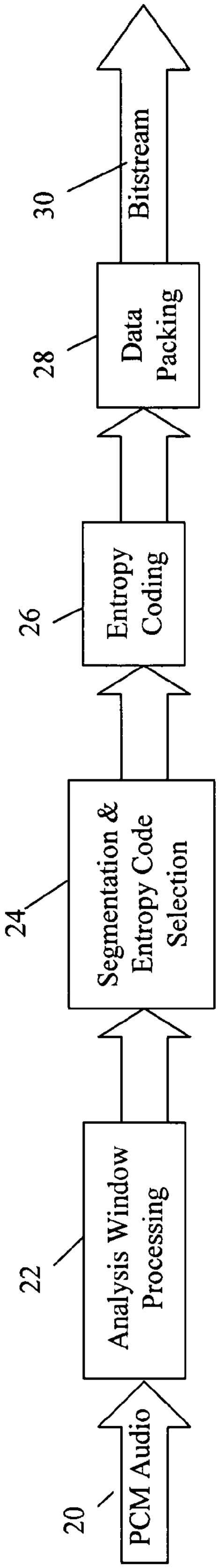
FIGS. 2*a* and 2*b* are block diagrams of a lossless audio encoder and decoder, respectively, in accordance with the present invention.
Figure 2B:
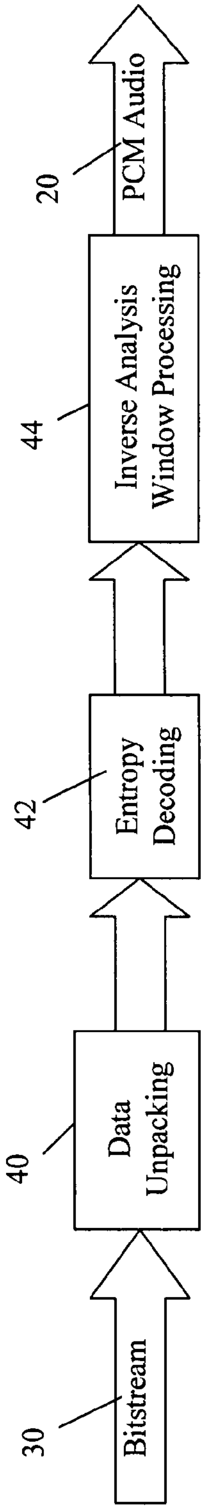

As shown in FIGS. 2*a* and 2*b*, the essential operational blocks are similar to existing lossless encoders and decoders with the exception of the segmentation and entropy code selection. The multi-channel PCM audio 20 is subjected to analysis window processing 22, which blocks the data in frames of a constant duration and removes redundancy by decorrelating the audio samples in each channel within a frame. Instead of entropy coding the residual signals directly, the present invention performs an optimal segmentation and entropy code selection process 24 that segments the data into a plurality of segments and determines the segment duration and coding parameters, e.g., the selection of a particular entropy coder and its parameters, for each segment that minimizes the encoded payload for the entire frame subject to the constraint that each segment must be fully decodable and less than a maximum size. The sets of coding parameters are optimized for each distinct channel and may be optimized for a global set of coding parameters. Each segment is then entropy coded 26 according to its particular set of coding parameters. The encoded data and header information is packed 28 into a bitstream 30.

Figure 3:
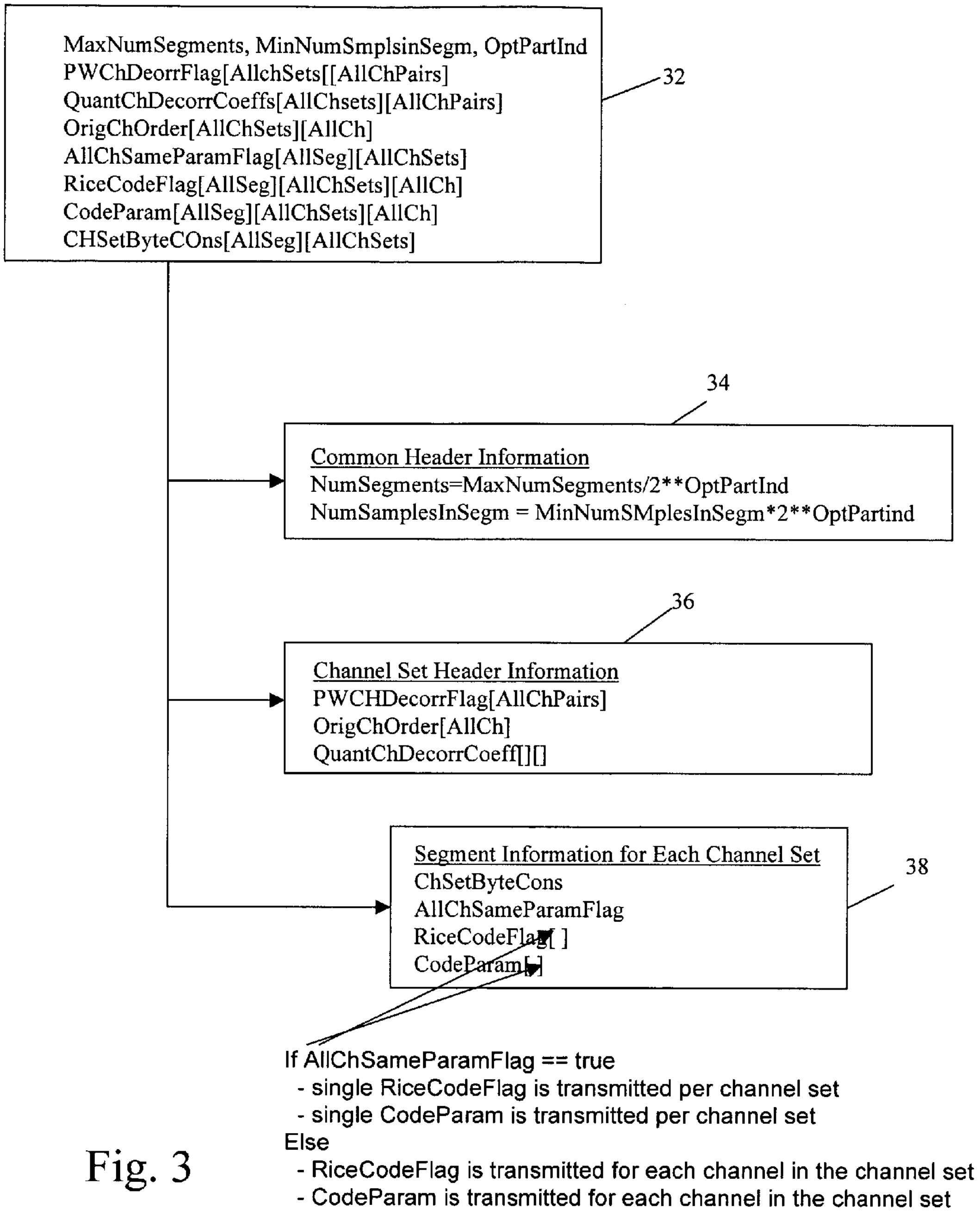
FIG. 3 is a diagram of header information as related to segmentation and entropy code selection.

As shown in FIG. 3, the header 32 includes additional information beyond what is ordinarily provided for a lossless codec in order to implement the segmentation and entropy code selection. More specifically, the header includes common header information 34 such as the number of segments (NumSegments) and the number of samples in each segment (NumSamplesInSegm), channel set header information 36 such as the quantized decorrelation coefficients (QuantChDecorrCoeff[ ] [ ]) and segment header information 38 such as the number of bytes in current segment for the channel set (ChSetByteCOns), a global optimization flag (AllChSameParamFlag) and entropy coder flags (RiceCodeFlag[ ], CodeParam[ ]) that indicate whether Rice or Binary coding is used and the coding parameter.

As shown in FIG. 2*b*, to perform the decode operation the bitstream 30 is unpacked 40 to extract the header information and encoded data. An entropy decode 42 is performed on each segment of each channel according to the assigned coding parameters to losslessly reconstruct the residual signals. These signals are then subjected to inverse analysis window processing 44, which performs inverse prediction to losslessly reconstruct the original PCM audio 20.

Analysis Windows Processing

Figure 4A:
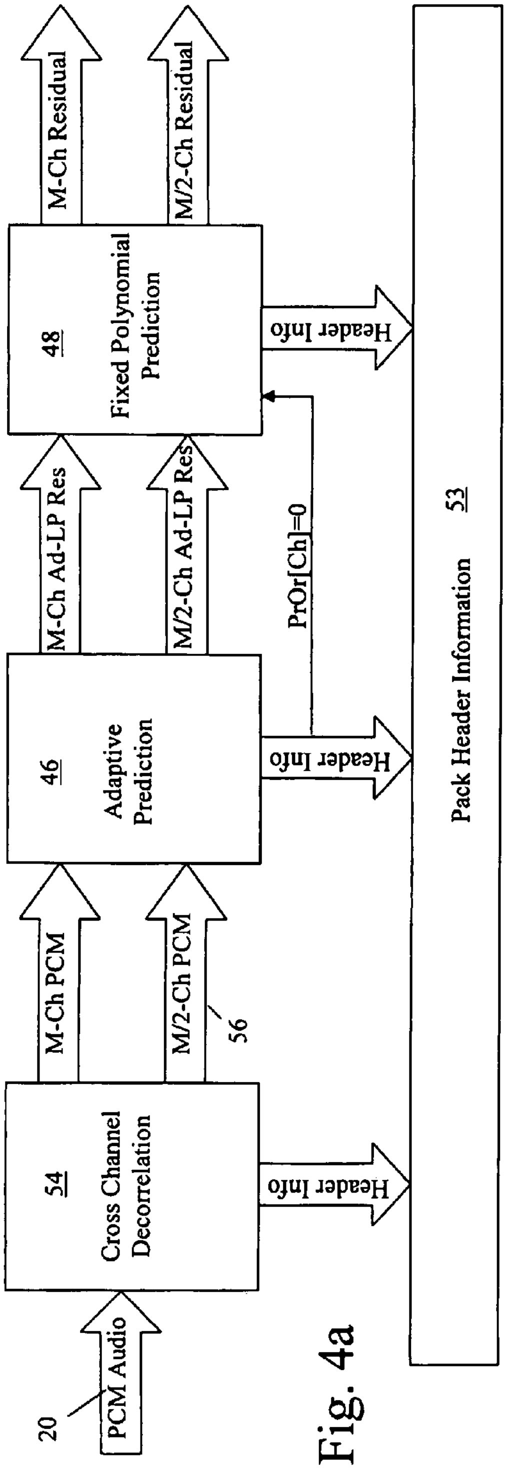
FIGS. 4*a* and 4*b* are block diagrams of the analysis window processing and inverse analysis window processing.
Figure 4B:
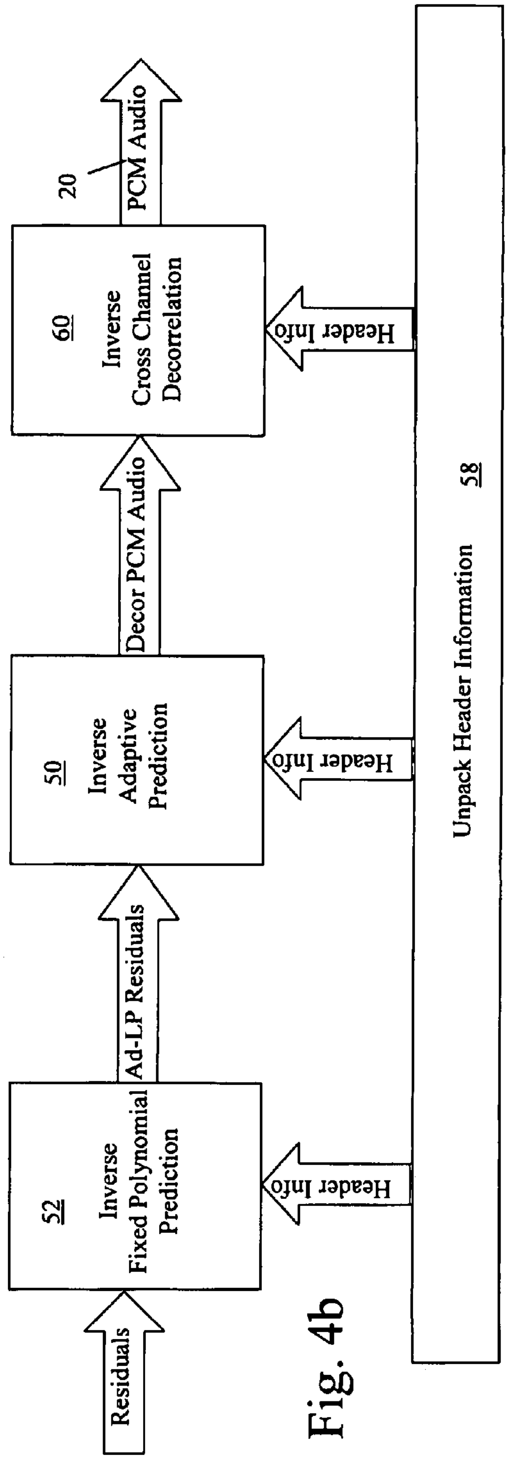

As shown in FIGS. 4*a* and 4*b*, an exemplary embodiment of analysis windows processing 22 selects from either adaptive prediction 46 or fixed polynomial prediction 48 to decorrelate each channel, which is a fairly common approach. As will be described in detail with reference to FIG. 6, an optimal predictor order is estimated for each channel. If the order is greater than zero, adaptive prediction is applied. Otherwise the simpler fixed polynomial prediction is used. Similarly, in the decoder the inverse analysis windows processing 44 selects from either inverse adaptive prediction 50 or inverse fixed polynomial prediction 52 to reconstruct PCM audio from the residual signals. The adaptive predictor orders and adaptive prediction coefficient indices and fixed predictor orders are packed 53 in the channel set header information.

Cross-Channel Decorrelation

In accordance with the present invention, compression performance may be further enhanced by implementing cross channel decorrelation 54, which orders the M input channels into channel pairs according to a correlation measure between the channels. One of the channels is designated as the "basis" channel and the other is designated as the "correlated" channel. A decorrelated channel is generated for each channel pair to form a "triplet" (basis, correlated, decorrelated). The formation of the triplet provides two possible pair combinations (basis, correlated) and (basis, decorrelated) that can be considered during the segmentation and entropy coding optimization to further improve compression performance (see FIG. 8*a*). A simpler but less effective approach would be to replace the correlated channel with the decorrelated channel if, for example, its variance was smaller.

The original M-ch PCM 20 and the M/2-ch decorrelated PCM 56 are both forwarded to the adaptive prediction and fixed polynomial prediction operations, which generate residual signals for each of the channels. As shown in FIG. 3, indices (OrigChOrder[ ]) that indicate the original order of the channels prior to the sorting performed during the pair-wise decorrelation process and a flag PWChDecorrFlag[ ] for each channel pair indicating the presence of a code for quantized decorrelation coefficients are stored in the channel set header 36 in FIG. 3.

As shown in FIG. 4*b*, to perform the decode operation of inverse analysis window processing 44 the header information is unpacked 58 and the residuals are passed through either inverse fixed polynomial prediction 52 or inverse adaptive prediction 50 according to the header information, namely the adaptive and fixed predictor orders for each channel. The M-channel decorrelated PCM audio (M/2 channels are discarded during segmentation) is passed through inverse cross channel decorrelation 60, which reads the OrigChOrder[ ] indices and PWChDecorrFlagg[ ] flag from the channel set header and losslessly reconstructs the M-channel PCM audio 20.

Figure 5:
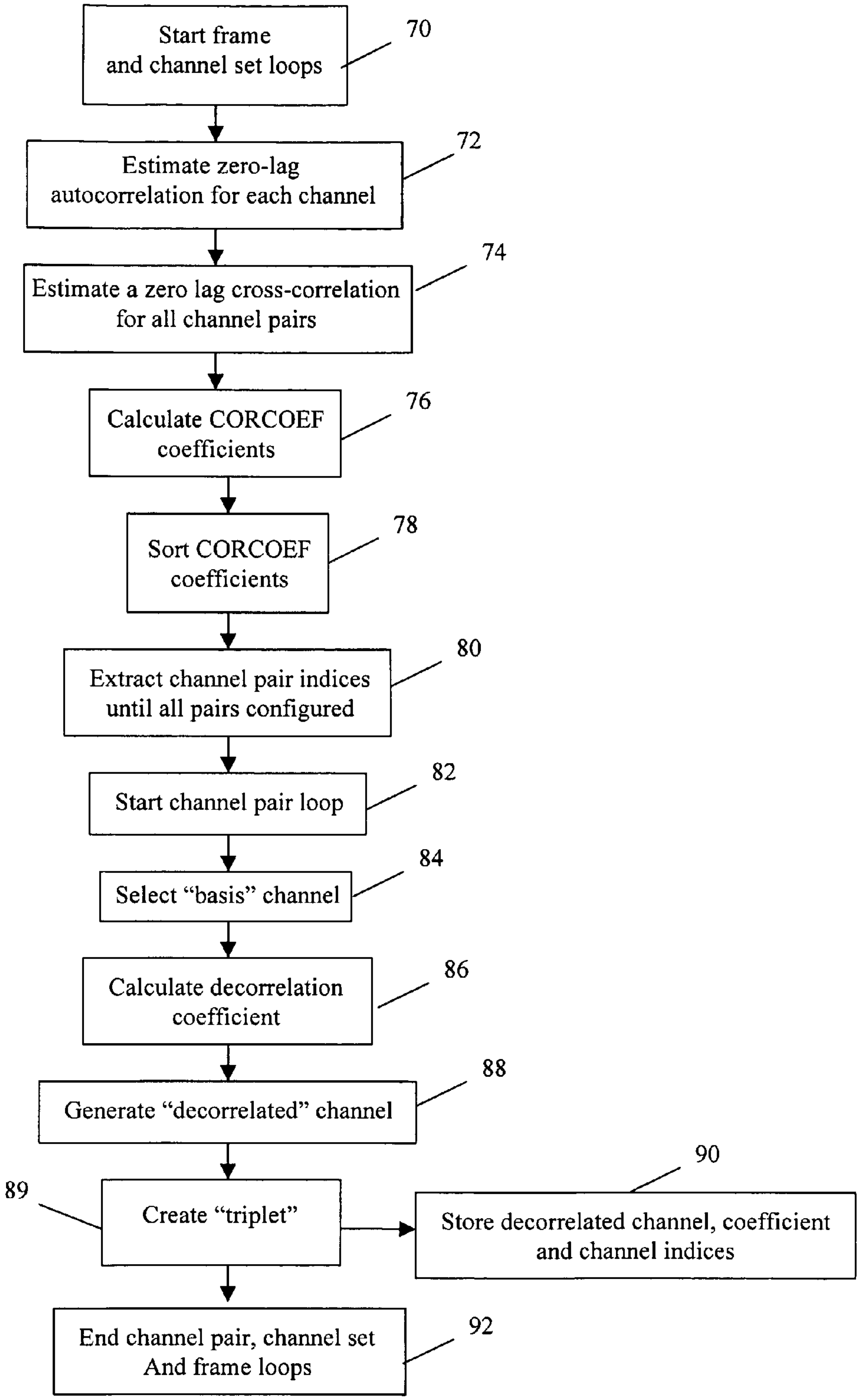
FIG. 5 is a flow chart of cross channel decorrelation.

An exemplary process for performing cross channel decorrelation 54 is illustrated in FIG. 5. By way of example, the PCM audio is provided as M=6 distinct channels, L,R,C,Ls, Rs and LFE, which also directly corresponds to one channel set configuration stored in the frame. Other channels sets may be, for example, left of center back surround and right of center back surround to produce 7.1 surround audio. The process starts by starting a frame loop and starting a channel set loop (step 70). The zero-lag auto-correlation estimate for each channel (step 72) and the zero-lag cross-correlation estimate for all possible combinations of channels pairs in the channel set (step 74) are calculated. Next, channel pair-wise correlation coefficients CORCOEF are estimated as the zero-lag cross-correlation estimate divided by the product of the zero-lag auto-correlation estimates for the involved channels in the pair (step 76). The CORCOEFs are sorted from the largest absolute value to the smallest and stored in a table (step 78). Starting from the top of the table, corresponding channel pair indices are extracted until all pairs have been configured (step 80). For example, the 6 channels may be paired based on their CORCOEF as (L,R), (Ls,Rs) and (C, LFE).

The process starts a channel pair loop (step 82), and selects a "basis" channel as the one with the smaller zero-lag auto-correlation estimate, which is indicative of a lower energy (step 84). In this example, the L, Ls and C channels form the basis channels. The channel pair decorrelation coefficient (ChPairDecorrCoeff) is calculated as the zero-lag cross-correlation estimate divided by the zero-lag auto-correlation estimate of the basis channel (step 86). The decorrelated channel is generated by multiplying the basis channel samples with the CHPairDecorrCoeff and subtracting that result from the corresponding samples of the correlated channel (step 88). The channel pairs and their associated decorrelated channel define "triplets" (L,R,R-ChPairDecorrCoeff[1]*L), (Ls,Rs,Rs-ChPairDecorrCoeff[2]*Ls), (C,LFE,LFE-ChPairDecorrCoeff[3]*C) (step 89). The ChPairDecorrCoeff[ ] for each channel pair (and each channel set) and the channel indices that define the pair configuration are stored in the channel set header information (step 90). This process repeats for each channel set in a frame and then for each frame in the windowed PCM audio (step 92).

Adaptive Prediction

Adaptive Prediction Analysis and Residual Generation

Linear prediction tries to remove the correlation between the samples of an audio signal. The basic principle of linear prediction is to predict a value of sample s(n) using the previous samples s(n−1), s(n−2), . . . and to subtract the predicted value ŝ(n) from the original sample s(n). The resulting residual signal e(n)=s(n)+ŝ(n) ideally will be uncorrelated and consequently have a flat frequency spectrum. In addition, the residual signal will have a smaller variance then the original signal implying that fewer bits are necessary for its digital representation. In an exemplary embodiment of the audio codec, a FIR predictor model is described by the following equation:

$$e(n) = s(n) + Q\left\{\sum_{k=1}^{M} a_k * s(n-k)\right\}$$

where Q{ } denotes the quantization operation, M denotes the predictor order and $a_k$ are quantized prediction coefficients. A particular quantization Q{ } is necessary for lossless compression since the original signal is reconstructed on the decode side, using various finite precision processor architectures. The definition of Q{ } is available to both coder and decoder and reconstruction of the original signal is simply obtained by:

$$s(n) = e(n) - Q\left\{\sum_{k=1}^{M} a_k * s(n-k)\right\}$$

where it is assumed that the same $a_k$ quantized prediction coefficients are available to both encoder and decoder. A new set of predictor parameters is transmitted per each analysis window (frame) allowing the predictor to adapt to the time varying audio signal structure.

The prediction coefficients are designed to minimize the mean-squared prediction residual. The quantization Q{ } makes the predictor a nonlinear predictor. However in the exemplary embodiment the quantization is done with 24-bit precision and it is reasonable to assume that the resulting non-linear effects can be ignored during predictor coefficient optimization. Ignoring the quantization Q{ }, the underlying optimization problem can be represented as a set of linear equations involving the lags of signal autocorrelation sequence and the unknown predictor coefficients. This set of linear equations can be efficiently solved using the Levinson-Durbin (LD) algorithm.

The resulting linear prediction coefficients (LPC) need to be quantized, such that they can be efficiently transmitted in an encoded stream. Unfortunately direct quantization of LPC is not the most efficient approach since the small quantization errors may cause large spectral errors. An alternative representation of LPCs is the reflection coefficient (RC) representation, which exhibits less sensitivity to the quantization errors. This representation can also be obtained from the LD algorithm. By definition of the LD algorithm the RCs are guaranteed to have magnitude ≦1 (ignoring numerical errors). When the absolute value of the RCs is close to 1 the sensitivity of linear prediction to the quantization errors present in quantized RCs becomes high. The solution is to perform non-uniform quantization of RCs with finer quantization steps around unity. This can be achieved in two steps:

1) transform RCs to a log-area ratio (LAR) representation by means of mapping function $$LAR = \log\frac{1+RC}{1-RC}$$

where log denotes natural base logarithm.

2) quantize uniformly the LARs

The RC−>LAR transformation warps the amplitude scale of parameters such that the result of steps 1 and 2 is equivalent to non-uniform quantization with finer quantization steps around unity.

Figure 6A:
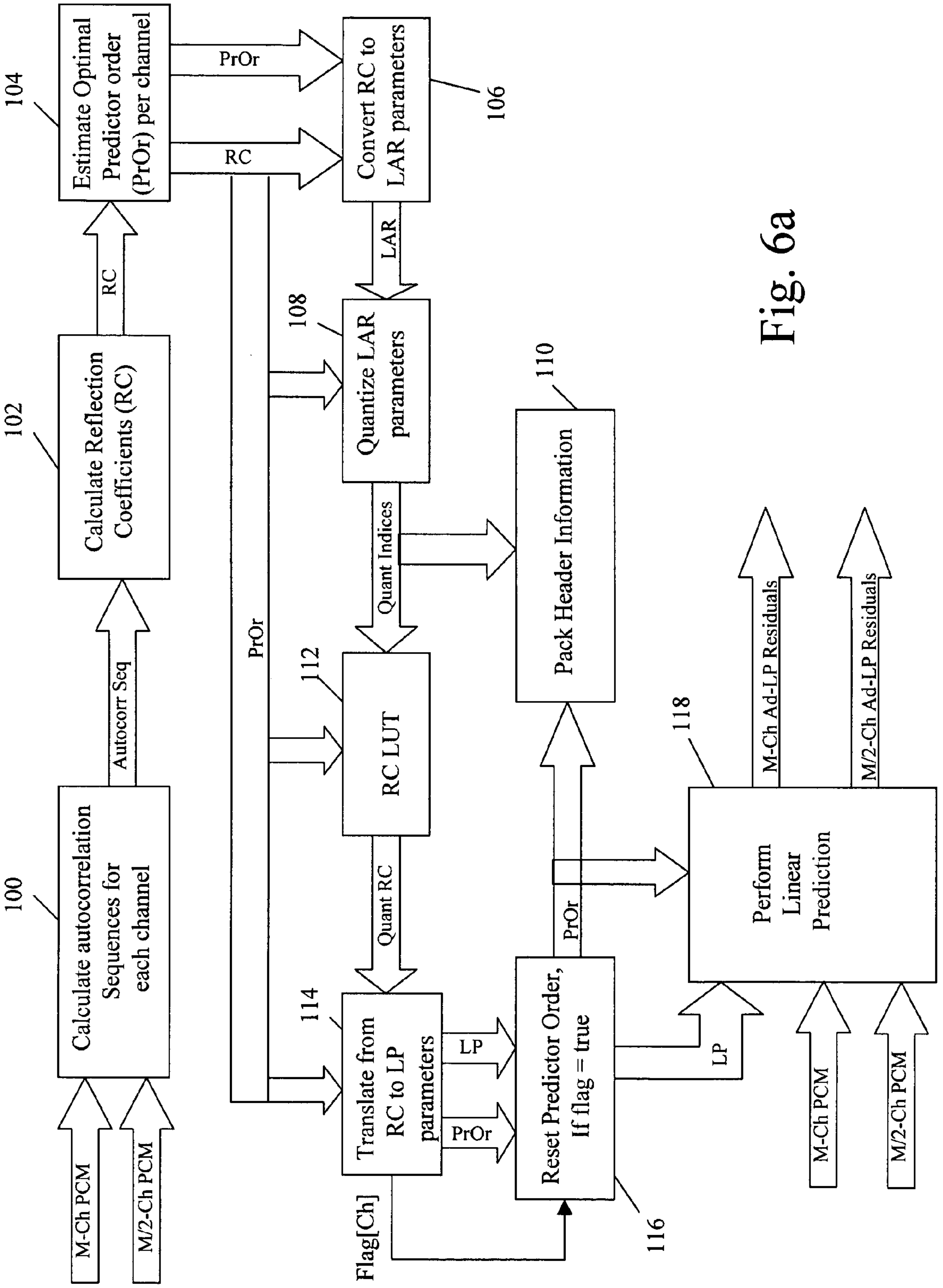
FIGS. 6*a* and 6*b* are block diagrams of adaptive prediction analysis and processing and inverse adaptive prediction processing.
Figure 6B:
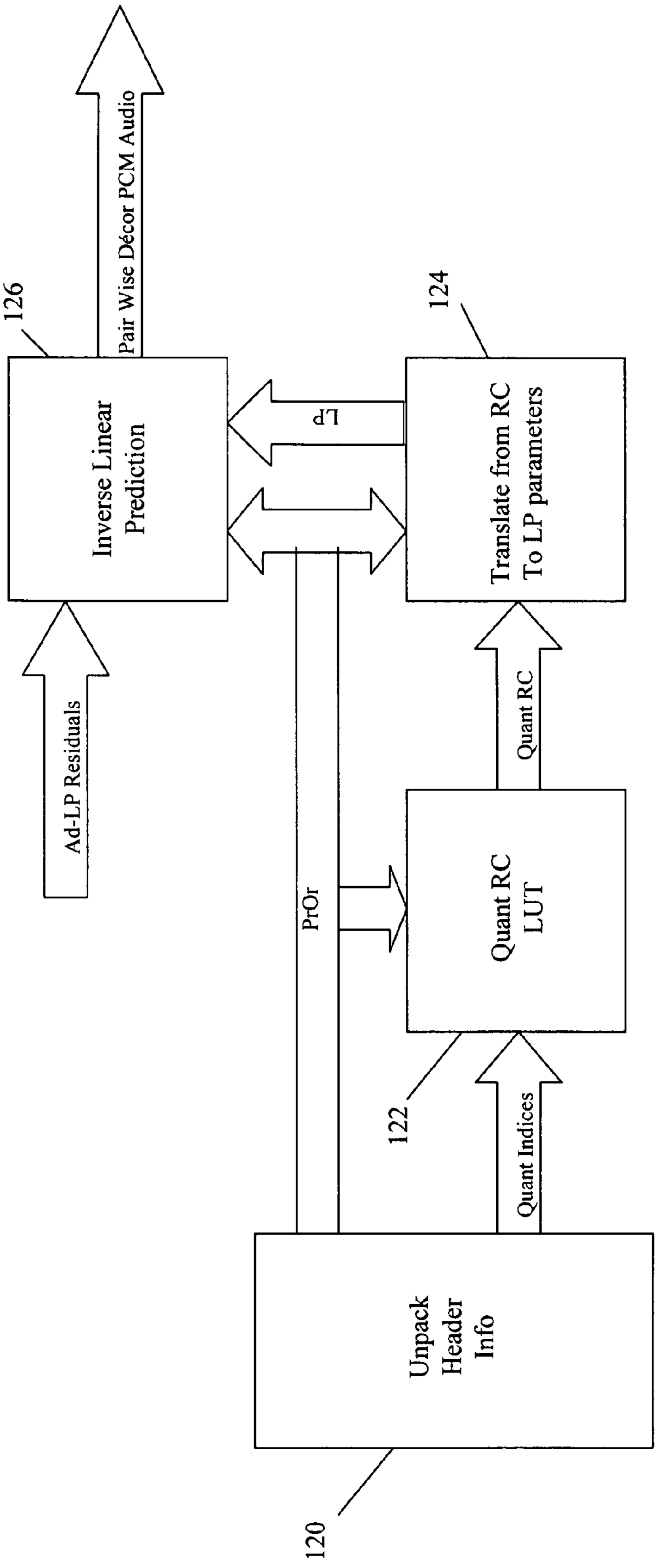

As shown in FIG. 6*a*, in an exemplary embodiment of adaptive prediction analysis quantized LAR parameters are used to represent adaptive predictor parameters and transmitted in the encoded bit-stream. Samples in each input channel are processed independent of each other and consequently the description will only consider processing in a single channel.

The first step is to calculate the autocorrelation sequence over the duration of analysis window (frame) (step 100). To minimize the blocking effects that are caused by discontinuities at the frame boundaries data is first windowed. The autocorrelation sequence for a specified number (equal to maximum LP order +1) of lags is estimated from the windowed block of data.

The Levinson-Durbin (LD) algorithm is applied to the set of estimated autocorrelation lags and the set of reflection coefficients (RC), up to the max LP order, is calculated (step 102). An intermediate result of the (LD) algorithm is a set of estimated variances of prediction residuals for each linear prediction order up to the max LP order. In the next block, using this set of residual variances, the linear predictor (PrOr) order is selected (step 104).

For the selected predictor order the set of reflection coefficients (RC) is transformed, to the set of log-aria ratio parameters (LAR) using the above stated mapping function (step 106). A limiting of the RC is introduced prior to transformation in order to prevent division by 0:

$$RC = \begin{cases} Tresh & \forall\ RC > Tresh \\ -1 & \forall\ RC < 1 \\ RC & \text{Otherwise} \end{cases}$$

where Tresh denotes number close to but smaller then 1. The LAR parameters are quantized (step 108) according to the following rule:

$$QLARInd = \begin{cases} \left\lfloor \frac{LAR}{q} \right\rfloor & \forall\ LAR \geq 0 \\ -\left\lfloor \frac{-LAR}{q} \right\rfloor & \forall\ LAR < 0 \end{cases}$$

where QLARInd denotes the quantized LAR indices, $\lfloor x \rfloor$ indicates operation of finding largest integer value smaller or equal to x and q denotes quantization step size. In the exemplary embodiment, region [−8 to 8] is coded using 8 bits i.e., $$q = \frac{2*8}{2^8}$$

and consequently QLARInd is limited according to:

$$QLARInd = \begin{cases} 127 & \forall\ QLARInd > 127 \\ -127 & \forall\ QLARInd < -127 \\ QLARInd & \text{Otherwise} \end{cases}$$

Prior to packing (step 110), QLARInd are translated from signed to unsigned values using the following mapping:

$$PackLARInd = \begin{cases} 2*QLARInd & \forall\ QLARInd \geq 0 \\ 2*(-QLARInd)-1 & \forall\ QLARIn < 0 \end{cases}$$

In the "RC LUT" block, an inverse quantization of LAR parameters and a translation to RC parameters is done in a single step using a look-up table (step 112). Look-up table consists of quantized values of the inverse RC−>LAR mapping i.e., LAR−>RC mapping given by:

$$RC = \frac{e^{LAR}-1}{e^{LAR}+1}$$

The look-up table is calculated at quantized values of LARs equal to 0, 1.5*q, 2.5*q, . . . 127.5*q. The corresponding RC values, after scaling by $2^{16}$, are rounded to 16 bit unsigned integers and stored as Q16 unsigned fixed point numbers in a 128 entry table.

Quantized RC parameters are calculated from the table and the quantization LAR indices QLARInd as $$QRC = \begin{cases} \text{TABLE}[QLARInd] & \forall\ QLARInd \geq 0 \\ -\text{TABLE}[-QLARInd] & \forall\ QLARInd < 0 \end{cases}$$

The quantized RC parameters QRCOrd for ord=1, . . . PrOr are translated to the quantized linear prediction parameters ($LP_{ord}$ for ord=1, . . . PrOr) according to the following algorithm (step 114):

```
For ord = 0 to PrOr − 1 do
  For m = 1 to ord do
    C_{ord+1, m} = C_{ord, m} + (QRC_{ord+1} *C_{ord, ord+1−m} + (1 << 15)) >> 16
```

-continued

```
    end
    C_ord+ord+1 = QRC_ord+1
  end
  For ord = 0 to PrOr − 1 do
    LP_ord+1 = C_PrOr, ord+1
  end
```

Since the quantized RC coefficients were represented in Q16 signed fixed point format the above algorithm will generate the LP coefficients also in Q16 signed fixed point format. The lossless decoder computation path is designed to support up to 24-bit intermediate results. Therefore it is necessary to perform a saturation check after each $C_{ord+1,m}$ is calculated. If the saturation occurs at any stage of the algorithm the saturation flag is set and the adaptive predictor order PrOr, for a particular channel, is reset to 0 (step 116). For this particular channel with PrOr=0 a fixed coefficient prediction will be performed instead of the adaptive prediction (See Fixed Coefficient Prediction). Note that the unsigned LAR quantization indices (PackLARInd [n] for n=1, . . . PrOr[Ch]) are packed into the encoded stream only for the channels with PrOr[Ch]>0.

Finally for each channel with PrOr>0 the adaptive linear prediction is performed and the prediction residuals e(n) are calculated according to the following equations (step 118):

$$\overline{s(n)} = \left[\left\{\sum_{k=1}^{PrOr} LP_k * s(n-k)\right\} + (1 << 15)\right] >> 16$$

$$\text{Limit } \overline{s(n)} \text{ to } 24-\text{bit range } (-2^{23} \text{ to } 2^{23}-1)$$

$$e(n) = s(n) + \overline{s(n)}$$

$$\text{Limit } e(n) \text{ to } 24-\text{bit range } (-2^{23} \text{ to } 2^{23}-1)$$

$$\text{for } n = PrOr + 1, \ldots \ NumSamplInFrame$$

Since the design goal in the exemplary embodiment is that every frame is a "random access point", the sample history is not carried over between the frames. Instead the prediction is engaged only at the PrOr+1 sample in the frame.

The adaptive prediction residuals e(n) are further entropy coded and packed into the encoded bit-stream.

Inverse Adaptive Prediction on the Decode Side

On the decode side, the first step in performing inverse adaptive prediction is to unpack the header information and extract the adaptive prediction orders PrOr[Ch] for each channel Ch=1, . . . NumCh (step 120). Next for the channels with PrOr[Ch]>0, the unsigned version of LAR quantization indices (PackLARInd[n] for n=1, . . . PrOr[Ch]) is extracted. For each channel Ch with prediction order PrOr[Ch]>0 the unsigned PackLARInd[n] are mapped to the signed values QLARInd[n] using the following mapping:

$$QLARInd[n] = \begin{cases} PackLARInd[n] >> 1 \forall \text{ even numbered } PackLARInd[n] \\ -(PackLARInd[n] >> 1) - 1 \forall \text{ odd numbered } PackLARInd[n] \end{cases}$$

$$\text{for } n = 1, \ldots, PrOr[Ch]$$

where the >> denotes an integer right shift operation.

An inverse quantization of LAR parameters and a translation to RC parameters is done in a single step using a Quant RC LUT (step 122). This is the same look-up table TABLE{ } as defined on the encode side. The quantized reflection coefficients for each channel Ch (QRC[n] for n=1, . . . PrOr[Ch]) are calculated from the TABLE{ } and the quantization LAR indices QLARInd[n], as $$QRC[n] = \begin{cases} \text{TABLE}[QLARInd[n]] \ \forall \ QLARInd[n] \geq 0 \\ -\text{TABLE}[-QLARInd[n]] \ \forall \ QLARInd[n] < 0 \end{cases}$$

$$\text{for } n = 1, \ldots, PrOr[Ch]$$

For each channel Ch, the quantized RC parameters $QRC_{ord}$ for ord=1, . . . PrOr[Ch] are translated to the quantized linear prediction parameters ($LP_{ord}$ for ord=1, . . . PrOr[Ch]) according to the following algorithm (step 124):

```
For ord = 0 to PrOr − 1 do
  For m = 1 to ord do
    C_ord+1, m = C_ord, m + (QRC_ord+1 *C_ord, ord+1−m + (1 << 15)) >> 16
  end
  C_ord+1, ord+1 = QRC_ord+1
end
For ord = 0 to PrOr − 1 do
  LP_ord+1 = C_prOr, ord+1
end
```

Any possibility of saturation of intermediate results is removed on the encode side. Therefore on the decode side there is no need to perform saturation check after calculation of each $C_{ord+1,m}$.

Finally for each channel with PrOr[Ch]>0 an inverse adaptive linear prediction is performed (step 126). Assuming that prediction residuals e(n) are previously extracted and entropy decoded the reconstructed original signals s(n) are calculated according to the following equations:

$$\overline{s(n)} = \left[\left\{\sum_{k=1}^{PrOr} LP_k * s(n-k)\right\} + (1 << 15)\right] >> 16$$

$$\text{Limit } \overline{s(n)} \text{ to } 24-\text{bit range } (-2^{23} \text{ to } 2^{23}-1)$$

$$e(n) = s(n) + \overline{s(n)}$$

$$\text{for } n = PrOr[Ch] + 1, \ldots \ NumSamplInFrame$$

Since the sample history is not kept between the frames the inverse adaptive prediction shall start from the (PrOr[Ch]+1) sample in the frame.

Fixed Coefficient Prediction

A very simple fixed coefficient form of the linear predictor has been found to be useful. The fixed prediction coefficients are derived according to a very simple polynomial approximation method first proposed by Shorten (T. Robinson. SHORTEN: Simple lossless and near lossless waveform compression. Technical report 156. Cambridge University Engineering Department Trumpington Street, Cambridge CB2 1PZ, UK December 1994). In this case the prediction coefficients are those specified by fitting a p order polynomial to the last p data points. Expanding on four approximations.

$$\hat{s}_0[n]=0$$

$$\hat{s}_1[n]=s[n-1]$$

$$\hat{s}_2[n]=2s[n-1]-s[n-2]$$

$$\hat{s}_3[n]=3s[n-1]-3s[n-2]+s[n-3]$$

An interesting property of these polynomials approximations is that the resulting residual signal, $e_k[n]=s[n]-\hat{s}_k[n]$can be efficiently implemented in the following recursive manner.

$$e_0[n]=s[n]$$

$$e_1[n]=e_0[n]-e_0[n-1]$$

$$e_2[n]=e_1[n]-e_1[n-1]$$

$$e_3[n]=e_2[n]-e_2[n-1]$$

The fixed coefficient prediction analysis is applied on a per frame basis and does not rely on samples calculated in the previous frame ($e_k[-1]=0$). The residual set with the smallest sum magnitude over entire frame is defined as the best approximation. The optimal residual order is calculated for each channel separately and packed into the stream as Fixed Prediction Order (FPO[Ch]). The residuals $e_{FPO[Ch]}[n]$ in the current frame are further entropy coded and packed into the stream.

The reverse fixed coefficient prediction process, on the decode side, is defined by an order recursive formula for the calculation of k-th order residual at sampling instance n:

$$e_k[n]=e_{k+1}[n]+e_k[n-1]$$

where the desired original signal s[n] is given by $$s[n]=e_0[n]$$

and where for each k-th order residual $e_k[-1]=0$. As an example recursions for the 3rd order fixed coefficient prediction are presented where the residuals $e_3[n]$ are coded, transmitted in the stream and unpacked on the decode side:

$$e_2[n]=e_3[n]+e_2[n-1]$$

$$e_1[n]=e_2[n]+e_1[n-1]$$

$$e_0[n]=e_1[n]+e_0[n-1]$$

$$s[n]=e_0[n]$$

Segmentation and Entropy Code Selection

Figure 7A:
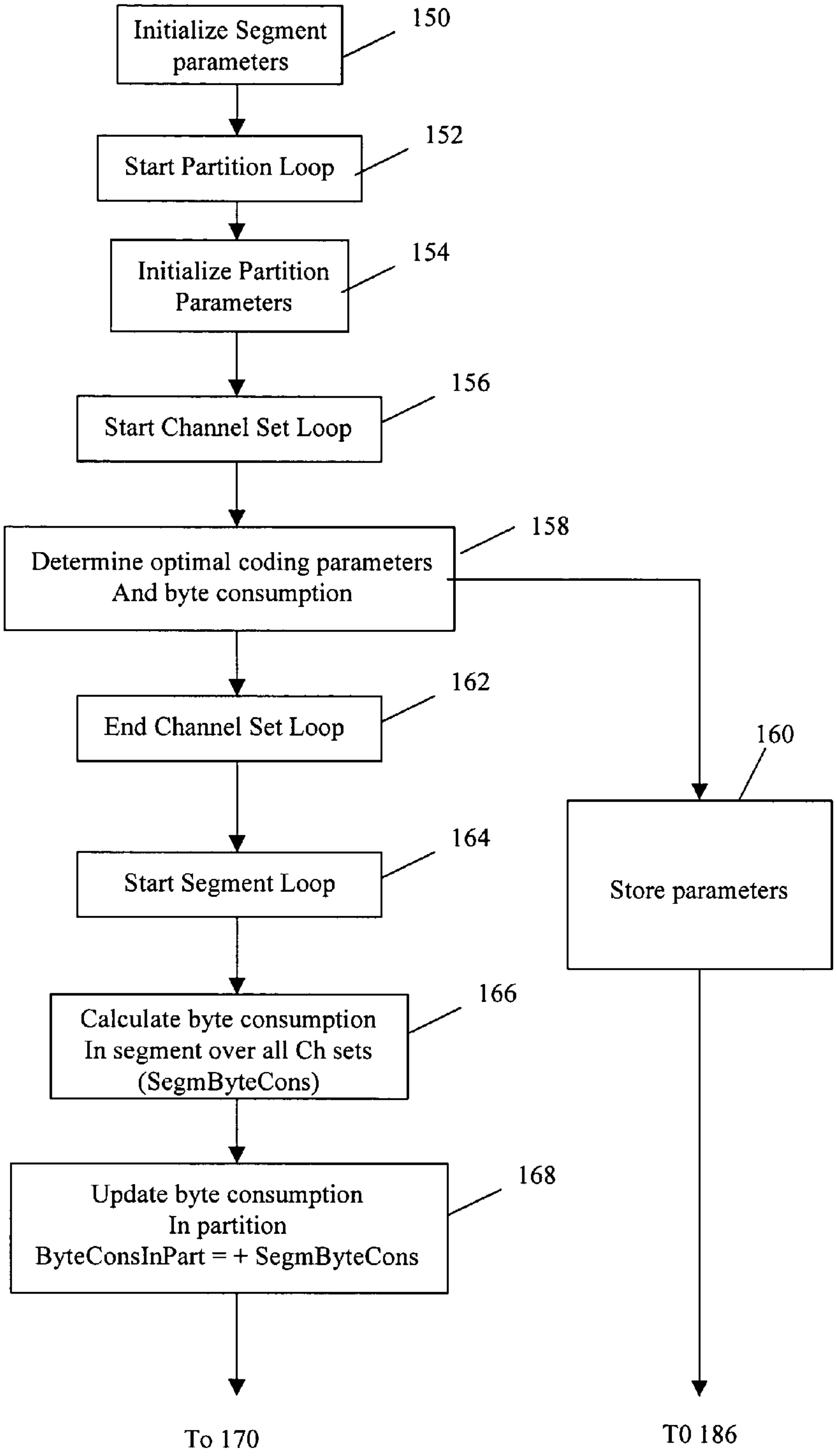
FIGS. 7*a* and 7*b* are a flow chart of optimal segmentation and entropy code selection.
Figure 7B:
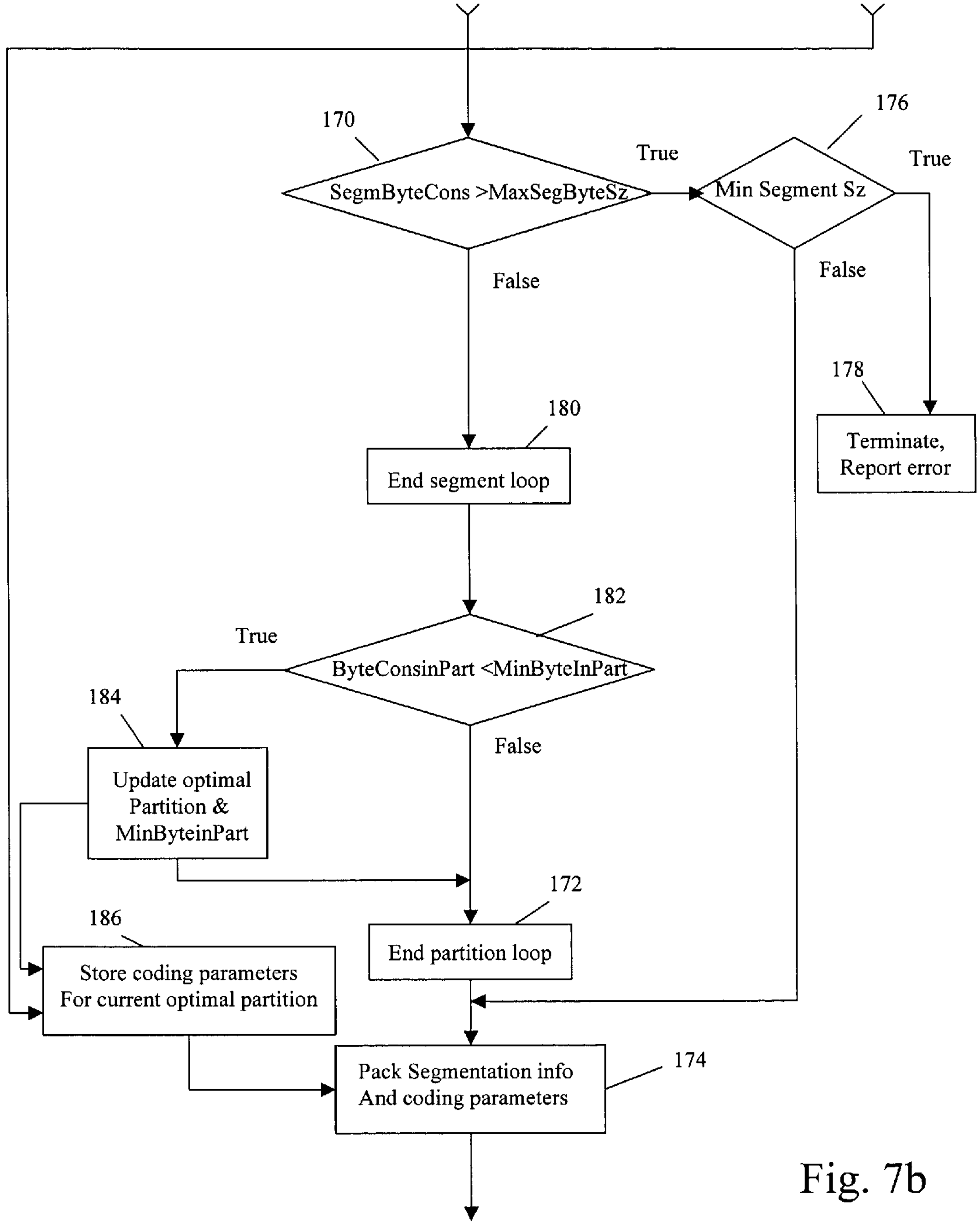

An exemplary embodiment of segmentation and entropy code selection 24 is illustrated in FIGS. 7 and 8. To establish the optimal segment duration, coding parameters (entropy code selection & parameters) and channel pairs, the coding parameters and channel pairs are determined for a plurality of different segment durations and from among those candidates the one with the minimum encoded payload per frame that satisfies the constraints that each segment must be independently decodable and not exceed a maximum size is selected. The "optimal" segmentation, coding parameters and channel pairs is of course subject to the constraints of the encoding process as well as the constraint on segment size. For example, in the exemplary process, the time duration of all segments in the frame is equal, the search for the optimal duration is performed on a dyadic grid, and the channel pair selection is valid over the entire frame. At the cost of additional encoder complexity and overhead bits, the time duration can be allowed to vary within a frame, the search for the optimal duration could be more finely resolved and the channel pair selection could be done on a per segment basis.

The exemplary process starts by initializing segment parameters (step 150) such as the minimum number of samples in a segment, the maximum allowed size of a segment, maximum number of segments and the maximum number of partitions. Thereafter, the processing starts a partition loop that is indexed from 0 to the maximum number of partitions minus one (step 152) and initializes the partition parameters including the number of segments, num samples in a segment and the number of bytes consumed in a partition (step 154). In this particular embodiment, the segments are of equal time duration and the number of segments scales as a power of two with each partition iteration. The number of segments is preferably initialized to the maximum, hence minimum time duration. However, the process could use segments of varying time duration, which might provide better compression of the audio data but at the expense of additional overhead. Furthermore, the number of segments does not have to be limited to powers of two or searched from the minimum to maximum duration.

Once initialized, the processes starts a channel set loop (step 156) and determines the optimal entropy coding parameters and channel pair selection for each segment and the corresponding byte consumption (step 158). The coding parameters PWChDecorrFlag[ ][ ], AllChSameParamFlag[ ][ ], RiceCodeFlag[ ][ ][ ], CodeParam[ ][ ][ ] and ChSetByteCons[ ][ ] are stored (step 160). This is repeated for each channel set until the channel set loop ends (step 162).

The process starts a segment loop (step 164) and calculates the byte consumption (SegmByteCons) in each segment over all channel sets (step 166) and updates the byte consumption (ByteConsInPart) (step 168). At this point, size of the segment is compared to the maximum size constraint (step 170). If the constraint is violated the current partition is discarded. Furthermore, because the process starts with the smallest time duration, once a segment size is too big the partition loop terminates (step 172) and the best solution (time duration, channel pairs, coding parameters) to that point is packed into the header (step 174) and the process moves onto the next frame. If the constraint fails on the minimum segment size (step 176), then the process terminates and reports an error (step 178) because the maximum size constraint cannot be satisfied. Assuming the constraint is satisfied, this process is repeated for each segment in the current partition until the segment loop ends (step 180).

Once the segment loop has been completed and the byte consumption for the entire frame calculated as represented by ByteConsinPart, this payload is compared to the current minimum payload (MinByteInPart) from a previous partition iteration (step 182). If the current partition represents an improvement then the current partition (PartInd) is stored as the optimum partition (OptPartind) and the minimum payload is updated (step 184). These parameters and the stored coding parameters are then stored as the current optimum solution (step 186). This is repeated until the partition loop ends (step 172), at which point the segmentation information and the coding parameters are packed into the header (step 150) as shown in FIG. 3.

Figure 8A:
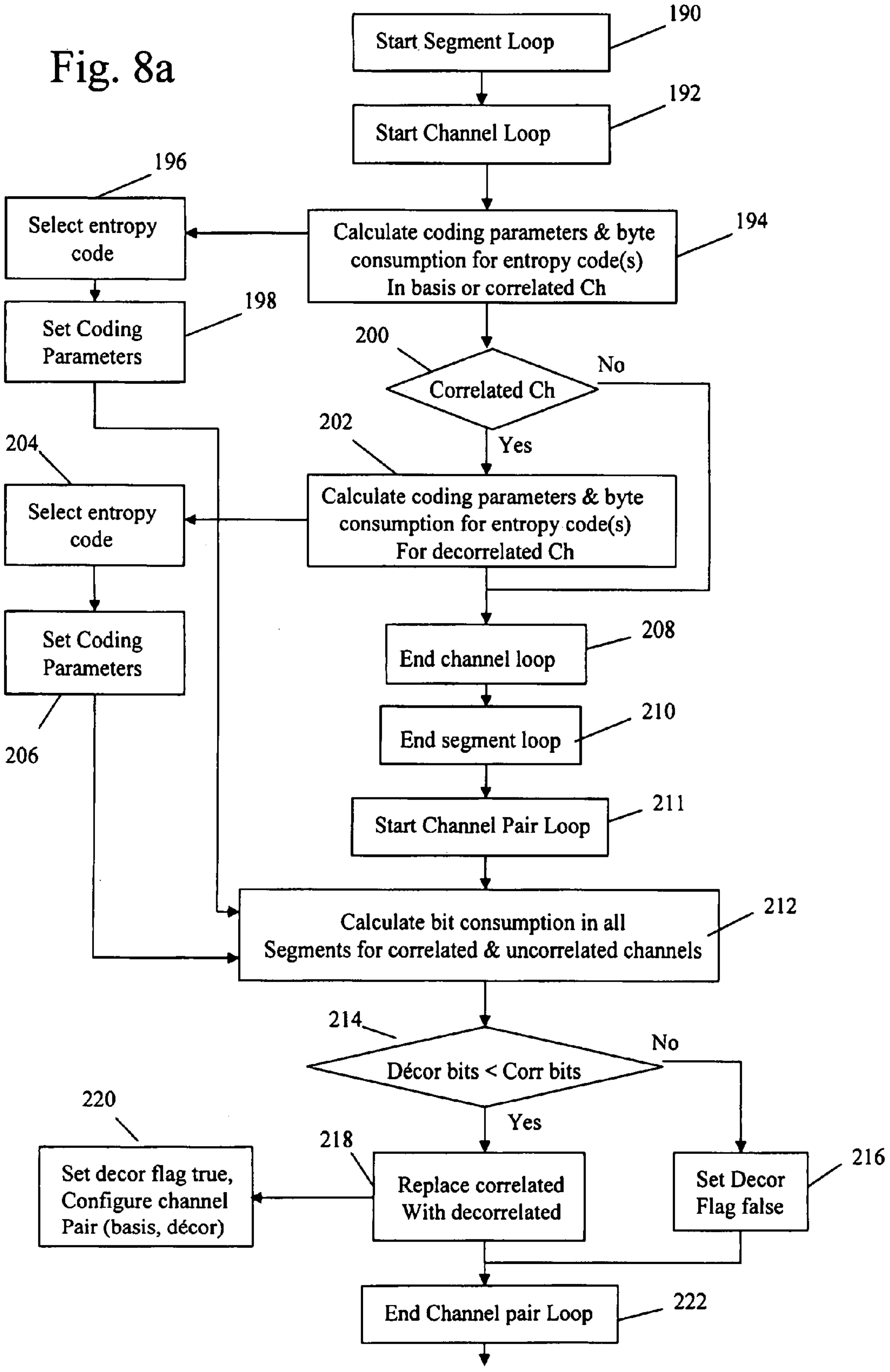
FIGS. 8*a* and 8*b* are flow charts of entropy code selection for a channel set.
Figure 8B:
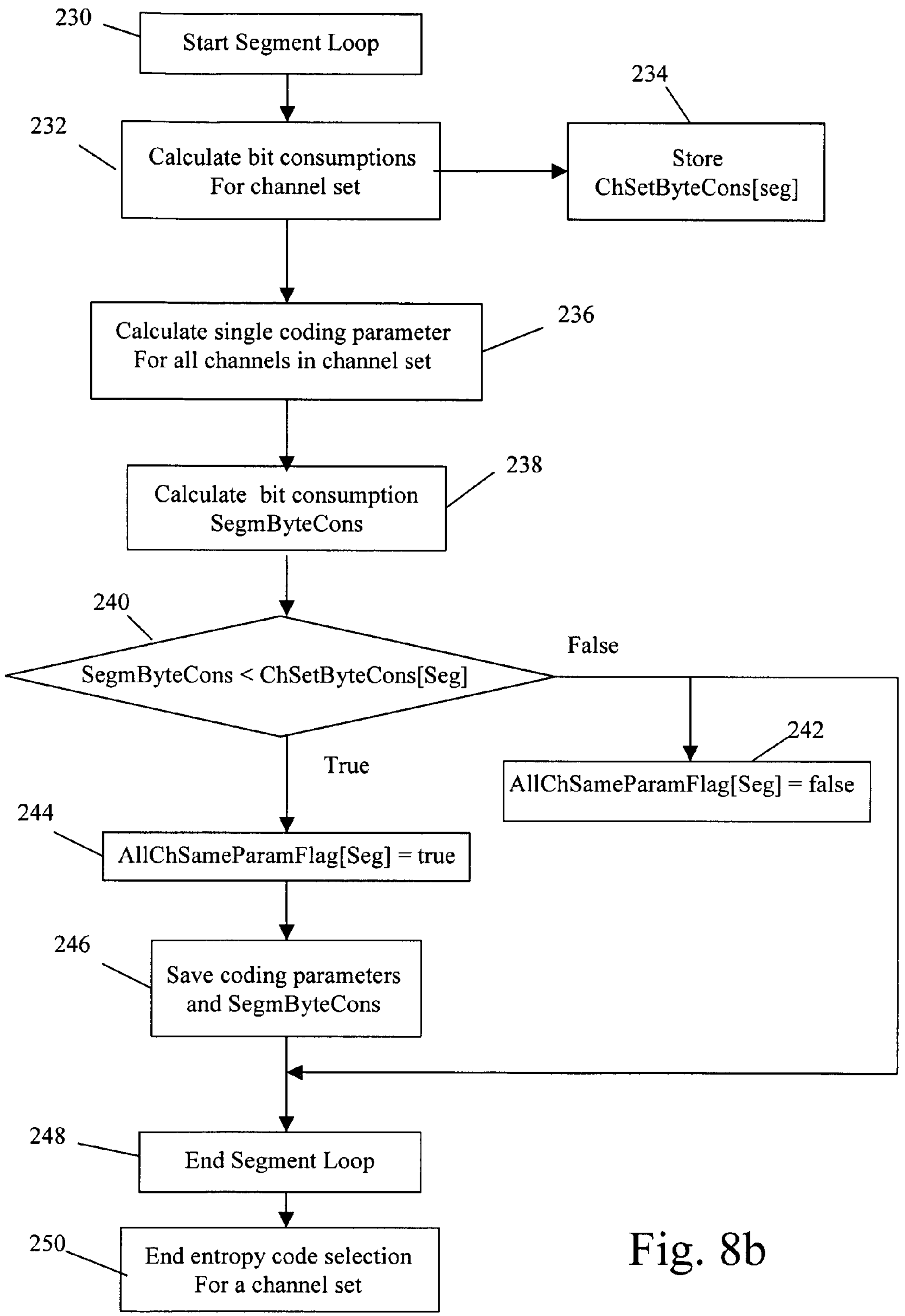

An exemplary embodiment for determining the optimal coding parameters and associated bit consumption for a channel set for a current partition (step 158) is illustrated in FIGS. 8*a* and 8*b*. The process starts a segment loop (step 190) and channel loop (step 192) in which the channels for our current example are:

Ch1: L,
Ch2: R
Ch3: R-ChPairDecorrCoeff[1]*L
Ch4: Ls
Ch5: Rs
Ch6: Rs-ChPairDecorrCoeff[2]*Ls
Ch7: C
Ch8: LFE
Ch9: LFE-ChPairDecorrCoeff[3]*C)

The process determines the type of entropy code, corresponding coding parameter and corresponding bit consumption for the basis and correlated channels (step 194). In this example, the process computes optimum coding parameters for a binary code and a Rice code and then selects the one with the lowest bit consumption for channel and each segment (step 196). In general, the optimization can be performed for one, two or more possible entropy codes. For the binary codes the number of bits is calculated from the max absolute value of all samples in the segment of the current channel. The Rice coding parameter is calculated from the average absolute value of all samples in the segment of the current channel. Based on the selection, the RiceCodeFlag is set, the BitCons is set and the CodeParam is set to either the NumBitsBinary or the RiceKParam (step 198).

If the current channel being processed is a correlated channel (step 200) then the same optimization is repeated for the corresponding decorrelated channel (step 202), the best entropy code is selected (step 204) and the coding parameters are set (step 206). The process repeats until the channel loop ends (step 208) and the segment loop ends (step 210).

At this point, the optimum coding parameters for each segment and for each channel have been determined. These coding parameters and payloads could be returned for the channel pairs (basis, correlated) from original PCM audio. However, compression performance can be improved by selecting between the (basis, correlated) and (basis, decorrelated) channels in the triplets.

To determine which channel pairs (basis, correlated) or (basis, uncorrelated) for the three triplets, a channel pair loop is started (step 211) and the contribution of each correlated channel (Ch2, Ch5 and Ch8) and each decorrelated channel (Ch3, Ch6 and Ch9) to the overall frame bit consumption is calculated (step 212). The frame consumption contributions for each correlated channel is compared against the frame consumption contributions for corresponding decorrelated channels, i.e., Ch2 to Ch3, Ch5 to Ch6, and Ch8 to Ch9 (step 214). If the contribution of the decorrelated channel is greater than the correlated channel, the PWChDecorrrFlag is set to false (step 216). Otherwise, the correlated channel is replaced with the decorrelated channel (step 218) and PWChDecorrrFlag is set to true and the channel pairs are configured as (basis, decorrelated) (step 220).

Based on these comparisons the algorithm will select:

1. Either Ch2 or Ch3 as the channel that will get paired with corresponding basis channel Ch1;
2. Either Ch5 or Ch6 as the channel that will get paired with corresponding basis channel Ch4; and
3. Either Ch8 or Ch9 as the channel that will get paired with corresponding basis channel Ch7.

These steps are repeated for all channel pairs until the loop ends (step 222).

At this point, the optimum coding parameters for each segment and each distinct channel and the optimal channel pairs have been determined. These coding parameters for each distinct, channel pairs and payloads could be returned to the partition loop. However, additional compression performance may be available by computing a set of global coding parameters for each segment across all channels. At best, the encoded data portion of the payload will be the same size as the coding parameters optimized for each channel and most likely somewhat larger. However, the reduction in overhead bits may more than offset the coding efficiency of the data.

Using the same channel pairs, the process starts a segment loop (step 230), calculates the bit consumptions (ChSetByteCons[seg]) per segment for all the channels using the distinct sets of coding parameters (step 232) and stores ChSetByteCons[seg] (step 234). A global set of coding parameters (entropy code selection and parameters) are then determined for the segment across all of the channels (step 236) using the same binary code and Rice code calculations as before except across all channels. The best parameters are selected and the byte consumption (SegmByteCons) is calculated (step 238). The SegmByteCons is compared to the CHSetByteCons[seg] (step 240). If using global parameters does not reduce bit consumption, the AllChSamParamFlag[seg] is set to false (step 242). Otherwise, the AllChSameParamFlag[seg] is set to true (step 244) and the global coding parameters and corresponding bit consumption per segment are saved (step 246). This process repeats until the end of the segment loop is reached (step 248). The entire process repeats until the channel set loop terminates step 250).

The encoding process is structured in a way that different functionality can be disabled by the control of a few flags. For example one single flag controls whether the pairwise channel decorrelation analysis is to be performed or not. Another flag controls whether the adaptive prediction (yet another flag for fixed prediction) analysis is to be performed or not. In addition a single flag controls whether the search for global parameters over all channels is to be performed or not. Segmentation is also controllable by setting the number of partitions and minimum segment duration (in the simplest form it can be a single partition with predetermined segment duration). In essence by setting a few flags in the encoder the encoder can collapse to simple framing and entropy coding.

Backward Compatible Lossless Audio Codec

The lossless codec can be used as an "extension coder" in combination with a lossy core coder. A "lossy" core code stream is packed as a core bitstream and a losslessly encoded difference signal is packed as a separate extension bitstream. Upon decoding in a decoder with extended lossless features, the lossy and lossless streams are combined to construct a lossless reconstructed signal. In a prior-generation decoder, the lossless stream is ignored, and the core "lossy" stream is decoded to provide a high-quality, multi-channel audio signal with the bandwidth and signal-to-noise ratio characteristic of the core stream.

Figure 9:
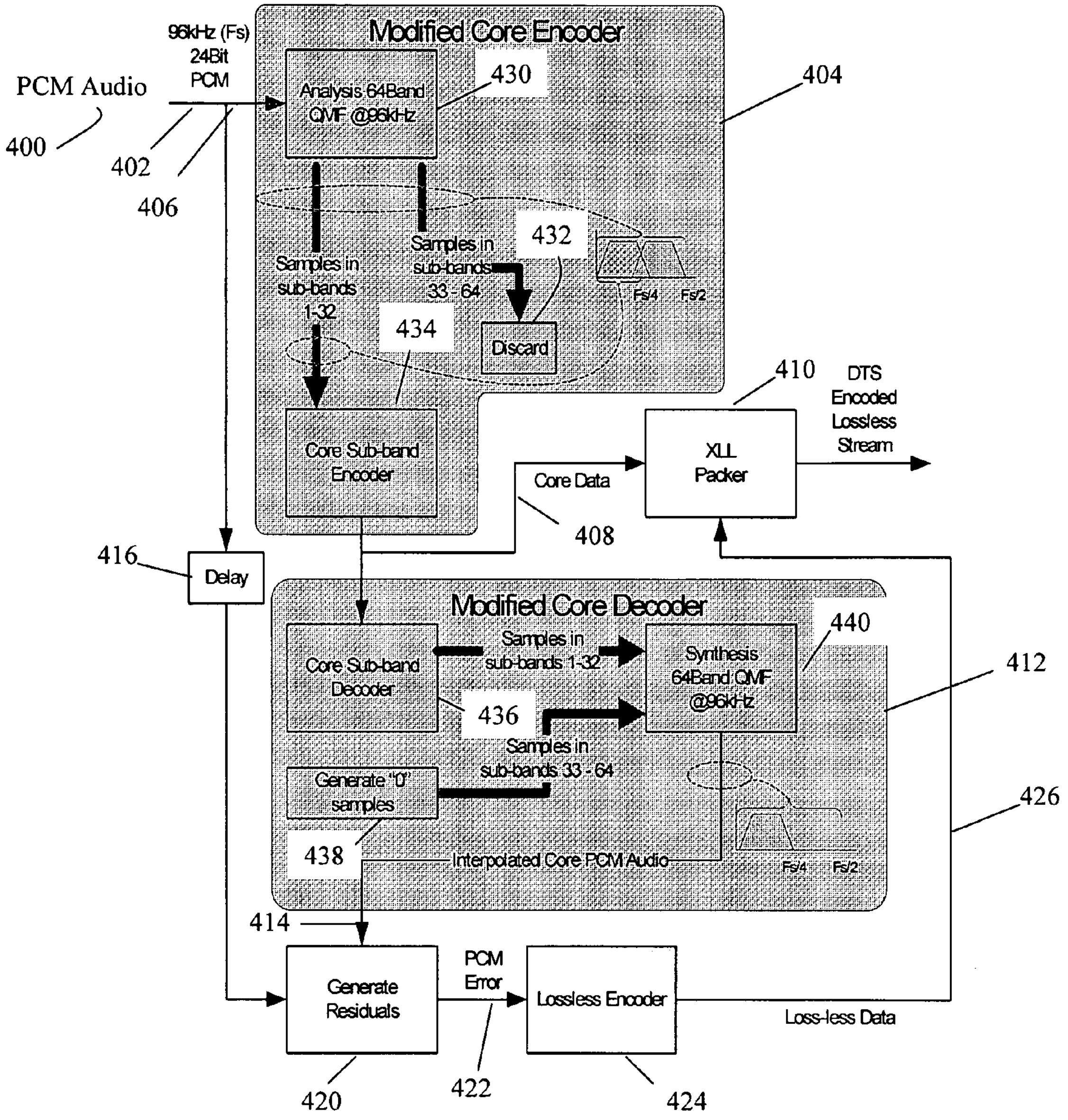
FIG. 9 is a block diagram of a core plus lossless extension codec.

FIG. 9 shows a system level view of a backward compatible lossless encoder 400 for one channel of a multi-channel signal. A digitized audio signal, suitably M-bit PCM audio samples, is provided at input 402. Preferably, the digitized audio signal has a sampling rate and bandwidth which exceeds that of a modified, lossy core encoder 404. In one embodiment, the sampling rate of the digitized audio signal is 96 kHz (corresponding to a bandwidth of 48 kHz for the sampled audio). It should also be understood that the input audio may be, and preferably is, a multi-channel signal wherein each channel is sampled at 96 kHz. The discussion which follows will concentrate on the processing of a single channel, but the extension to multiple channels is straightforward. The input signal is duplicated at node 406 and handled in parallel branches. In a first branch of the signal path, a modified lossy, wideband encoder 404 encodes the signal.

The modified core encoder 404, which is described in detail below, produces an encoded core bitstream 408 which is conveyed to a packer or multiplexer 410. The core bitstream 408 is also communicated to a modified core decoder 412, which produces as output a modified, reconstructed core signal 414.

Meanwhile, the input digitized audio signal 402 in the parallel path undergoes a compensating delay 416, substantially equal to the delay introduced into the reconstructed audio stream (by modified encode and modified decoders), to produce a delayed digitized audio stream. The audio stream 400 is subtracted from the delayed digitized audio stream 414 at summing node 420.

Summing node 420 produces a difference signal 422 which represents the original signal and the reconstructed core signal. To accomplish purely "lossless" encoding, it is necessary to encode and transmit the difference signal with lossless encoding techniques. Accordingly, the difference signal 422 is encoded with a lossless encoder 424, and the extension bitstream 426 is packed with the core bitstream 408 in packer 410 to produce an output bitstream 428.

Note that the lossless coding produces an extension bitstream 426 which is at a variable bit rate, to accommodate the needs of the lossless coder. The packed stream is then optionally subjected to further layers of coding including channel coding, and then transmitted or recorded. Note that for purposes of this disclosure, recording may be considered as transmission through a channel.

The core encoder 404 is described as "modified" because in an embodiment capable of handling extended bandwidth the core encoder would require modification. A 64-band analysis filter bank 430 within the encoder discards half of its output data 432 and a core sub-band encoder 434 encodes only the lower 32 frequency bands. This discarded information is of no concern to legacy decoders that would be unable to reconstruct the upper half of the signal spectrum in any case. The remaining information is encoded as per the unmodified encoder to form a backwards-compatible core output stream. However, in another embodiment operating at or below 48 kHz sampling rate, the core encoder could be a substantially unmodified version of a prior core encoder. Similarly, for operation above the sampling rate of legacy decoders, the modified core decoder 412 includes a core sub-band decoder 436 that decodes samples in the lower 32 sub-bands. The modified core decoder takes the sub-band samples from the lower 32 sub-bands and zeros out the untransmitted sub-band samples for the upper 32 bands 438 and reconstructs all 64 bands using a 64-band QMF synthesis filter 440. For operation at conventional sampling rate (e.g., 48 kHz and below) the core decoder could be a substantially unmodified version of a prior core decoder or equivalent. In some embodiments the choice of sampling rate could be made at the time of encoding, and the encode and decode modules reconfigured at that time by software as desired.

Since the lossless encoder is being used to code the difference signal, it may seem that a simple entropy code would suffice. However, because of the bit rate limitations on the existing lossy core codecs, a considerable amount of the total bits required to provide a lossless bitstream still remain. Furthermore, because of the bandwidth limitations of the core codec the information content above 24 kHz in the difference signal is still correlated. For example plenty of harmonic components including trumpet, guitar, triangle . . . reach far beyond 30 kHz). Therefore more sophisticated lossless codecs that improve compression performance add value. In addition, in some applications the core and extension bitstreams must still satisfy the constraint that the decodable units must not exceed a maximum size. The lossless codec of the present invention provides both improved compression performance and improved flexibility to satisfy these constrains.

By way of example, 8 channels of 24-bit 96 Khz PCM audio requires 18.5 Mbps. Lossless compression can reduce this to about 9 Mbps. DTS Coherent Acoustics would encode the core at 1.5 Mbps, leaving a difference signal of 7.5 Mbps. For 2 kByte max segment size, the average segment duration is 2048*8/7500000=2.18 msec or roughly 209 samples @96 kHz. A typical frame size for the lossy core to satisfy the max size is between 10 and 20 msec.

At a system level, the lossless codec and the backward compatible lossless codec may be combined to losslessly encode extra audio channels at an extended bandwidth while maintaining backward compatibility with existing lossy codecs. For example, 8 channels of 96 kHz audio at 18.5 Mbps may be losslessly encoded to include 5.1 channels of 48 kHz audio at 1.5 Mbps. The core plus lossless encoder would be used to encode the 5.1 channels. The lossless encoder will be used to encode the difference signals in the 5.1 channels. The remaining 2 channels are coded in a separate channel set using the lossless encoder. Since all channel sets need to be considered when trying to optimize segment duration, all of the coding tools will be used in one way or another. A compatible decoder would decode all 8 channels and losslessly reconstruct the 96 kHz 18.5 Mbps audio signal. An older decoder would decode only the 5.1 channels and reconstruct the 48 kHz 1.5 Mbps.

In general, more then one pure lossless channel set can be provided for the purpose of scaling the complexity of the decoder. For example, for an 10.2 original mix the channel sets could be organized such that:

- CHSET1 carries 5.1 (with embedded 10.2 to 5.1 downmix) and is coded using core+lossless
- CHSET1 and CHSET2 carry 7.1 (with embedded 10.2 to 7.1 downmix) where CHSET2 encodes 2 channels using lossless
- CHSET1+CHSET2+CHSET3 carry full discrete 10.2 mix where CHSET3 encodes remaining 3.1 channels using lossless only A decoder that is capable of decoding just 5.1 will only decode CHSET1 and ignore all other channels sets. A decoder that is capable of decoding just 7.1 will decode CHSET1 and CHSET2 and ignore all other channels sets.

Furthermore, the lossy plus lossless core is not limited to 5.1. Current implementations support up to 6.1 using lossy (core+XCh) and lossless and can support a generic m.n channels organized in any number of channel sets. The lossy encoding will have a 5.1 backward compatible core and all other channels that are coded with the lossy codec will go into the XXCh extension. This provides the overall lossless coded with considerable design flexibility to remain backward compatible with existing decoders while support additional channels.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method of decoding a lossless variable bit-rate (VBR) multi-channel audio bitstream, comprising:

receiving a lossless VBR multi-channel audio bitstream as a sequence of frames having a variable length frame payload and including at least one independently decodable and losslessly reconstructable channel set including a plurality of audio channels for a multi-channel audio signal, each frame comprising common header information including a number of segments and a number of samples per segment that reduce the frame payload subject to the constraints that each segment be less than a maximum payload size and fully decodable and losslessly reconstructable once the segment is unpacked, channel set header information including decompression coefficients for each said channel in each said channel set, and segment header information for each said channel set including at least one entropy code flag and at least one coding parameter, and entropy coded compressed multi-channel audio signals stored in said number of segments;

unpacking the header to extract the number of segments and number of samples per segment;

unpacking the header for at least one said channel set to extract the entropy code flag and coding parameter and the entropy coded compressed multi-channel audio signals and perform an entropy decode on each segment in the frame using the selected entropy code and coding parameter to generate compressed audio signals for each segment; and unpacking the header for at least one said channel set to extract decompression coefficients and perform decompression on the compressed audio signals to losslessly reconstruct PCM audio for each audio channel in each said channel set for each segment.

2. The method of claim 1, wherein the number of segments and samples per segment varies frame-to-frame to minimize the variable length payload of each frame subject to the constraints.

3. The method of claim 2, wherein each segment within one said frame has the same number of samples.

4. The method of claim 3, wherein each said frame includes the minimum number of segments that satisfies the constraints.

5. The method of claim 1, wherein said decompression coefficients comprise prediction coefficients, said decompression comprising performing an inverse prediction on the compressed audio signals.

6. A method of decoding a lossless bitstream, comprising:

receiving a bitstream as a sequence of frames comprising common header information including a number of segments and a number of samples per segment, channel set header information including prediction coefficients for each audio channel in a channel set, and segment header information for each channel set including bytes consumed, at least one entropy code flag, at least one coding parameter, and an all channel same parameter flag that indicates whether the at least one entropy code flag and the at least one coding parameter are distinct for each channel or whether they are the same for all channels in a channel set, and encoded residual multi-channel audio signals stored in a plurality of segments;

unpacking the header to extract the all channel same parameter flag, the at least one entropy code flag and the at least one coding parameter and the encoded residual audio signals and perform an entropy decode on each segment of a channel set in the frame using the selected entropy code and coding parameter to generate residual audio signals for each segment of a channel set; and unpacking the header to extract prediction coefficients and perform an inverse prediction on the residual audio signals to generate PCM audio for each segment of a channel set.

7. A method of decoding a lossless bitstream, comprising:

receiving a bitstream as a sequence of frames comprising common header information including a number of segments and a number of samples per segment, channel set header information including a pairwise channel decorrelation flag, an original channel order, and quantized channel decorrelation coefficients and prediction coefficients for each audio channel, and segment header information for each channel set including bytes consumed, at least one entropy code flag and at least one coding parameter, and encoded residual multi-channel audio signals stored in a plurality of segments;

unpacking the header to extract the entropy code flag and coding parameter and the encoded residual audio signals and perform an entropy decode on each segment of a channel set in the frame using the selected entropy code and coding parameter to generate residual audio signals for each segment of a channel set;

unpacking the header to extract prediction coefficients and perform an inverse prediction on the residual audio signals to generate decorrelated PCM audio for each segment of a channel set;

unpacking the header to extract the original channel order, the pairwise channel decorrelation flag and the quantized channel decorrelation coefficients and perform an inverse cross channel decorrelation to generate multi-channel PCM audio for a channel set.

8. The method of claim 7, wherein the pairwise channel decorrelation flag indicates whether a first channel pair including a basis and a correlated channel or a second channel pair including the basis and a decorrelated channels for a triplet including the basis, correlated and decorrelated channels was encoded, the method further comprising:

if the flag indicates a second channel pair, multiply the basis channel by the quantized channel decorrelation coefficient and add it to the decorrelated channel to generate PCM audio in the correlated channel.

9. A method of decoding a lossless variable bit-rate (VBR) multi-channel audio bitstream, comprising:

receiving a lossless VBR multi-channel audio bitstream as a sequence of frames having a variable length frame payload and including at least one independently decodable and losslessly reconstructable channel set including a plurality of audio channels for a multi-channel audio signal, each frame comprising common header information including a number of segments and a number of samples per segment, channel set header information including decompression coefficients for each audio channel in a channel set, and segment header information for each channel set including at least one entropy code flag, at least one coding parameter, and an all channel same parameter flag that indicates whether the at least one entropy code flag and the at least one coding parameter are distinct for each channel or whether they are the same for all channels in a channel set, and entropy coded compressed multi-channel audio signals stored in said number of segments;

unpacking the header to extract the all channel same parameter flag, the at least one entropy code flag and the at least one coding parameter and the entropy coded compressed multi-channel audio signals for a channel set and perform an entropy decode on each segment in the frame using the selected entropy code and coding parameter to generate compressed audio signals for the channel set for each segment; and unpacking the header for the channel set to extract decompression coefficients and decompress the compressed audio signals to generate PCM audio for each audio channel of the channel set for each segment.

10. A method of decoding a lossless variable bit-rate (VBR) multi-channel audio bitstream, comprising:

receiving a lossless VBR multi-channel audio bitstream as a sequence of frames having a variable length frame payload and including at least one independently decodable and losslessly reconstructable channel set including a plurality of audio channels for a multi-channel audio signal, each frame comprising common header information including a number of segments and a number of samples per segment, channel set header information including a pairwise channel decorrelation flag, an original channel order, and quantized channel decorrelation coefficients and decompression coefficients for each audio channel, and segment header information for each channel set including at least one entropy code flag and at least one coding parameter, and entropy coded compressed multi-channel audio signals stored in the number of segments;

unpacking the header to extract the entropy code flag and coding parameter and the entropy coded compressed multi-channel audio signals and perform an entropy decode on each segment in the frame using the selected entropy code and coding parameter to generate compressed audio signals for the channel set for each segment; and unpacking the header to extract compression coefficients and decompress the compressed audio signals to generate decorrelated PCM audio for the channel set for each segment; and unpacking the header to extract the original channel order, the pairwise channel decorrelation flag and the quantized channel decorrelation coefficients and perform an inverse cross channel decorrelation to generate multichannel PCM audio for the channel set for each segment.

11. The method of claim 10, wherein the pairwise channel decorrelation flag indicates whether a first channel pair including a basis and a correlated channel or a second channel pair including the basis and a decorrelated channel for a triplet including the basis, correlated and decorrelated channels was encoded, the method further comprising:

if the flag indicates a second channel pair, multiply the basis channel by the quantized channel decorrelation coefficient and add it to the decorrelated channel to generate PCM audio in the correlated channel.

12. The method of claim 11 wherein a first channel set includes 5.1 multi-channel audio and a second channel set includes at least one additional audio channel.

13. The method of claim 11, wherein multiple said segments are independently decodable.

14. The method of claim 13, wherein each said segment is independently decodable.

15. A method of decoding a lossless variable bit-rate (VBR) multi-channel audio bitstream, comprising:

receiving a lossless VBR multi-channel audio bitstream as a sequence of frames having a variable length frame payload and including a plurality of independently decodable and losslessly reconstructable channel sets including different subsets of audio channels for a multichannel audio signal, each frame comprising common header information including a number of segments and a number of samples per segment, channel set header information including decompression coefficients for each said channel in each said channel set, and segment header information for each said channel set including bytes consumed, an at least one entropy code flag and at least one coding parameter, and entropy coded compressed multi-channel audio signals stored in said number of segments, at least one said segment being independently decodable and losslessly reconstructable;

unpacking the common header information to extract the number of segments and number of samples per segment;

unpacking the segment header information for at least one said channel set to extract the entropy code flag and coding parameter and the entropy coded compressed multi-channel audio signals and perform an entropy decode on each segment in the frame using the selected entropy code and coding parameter to generate compressed audio signals for said at least one said channel set for each segment; and unpacking the channel header information for at least one said channel set to extract decompression coefficients and perform decompression on the compressed audio signals to losslessly reconstruct PCM audio for each audio channel in said at least one channel set for each segment.

16. The method of claim 15, wherein the segment headers and the entropy coded compressed multi-channel audio signals for all of said channel sets are unpacked and all of the compressed multi-channel audio signals are decoded to losslessly reconstruct PCM audio for the full multi-channel audio signal.

17. The method of claim 15, wherein the segment headers and the entropy coded compressed multi-channel audio signals for less than all of said channel sets are unpacked and the corresponding compressed audio signals decoded to losslessly reconstruct PCM audio for a partial multi-channel audio signal.

* * * * *